UNITED STATES PATENT OFFICE.

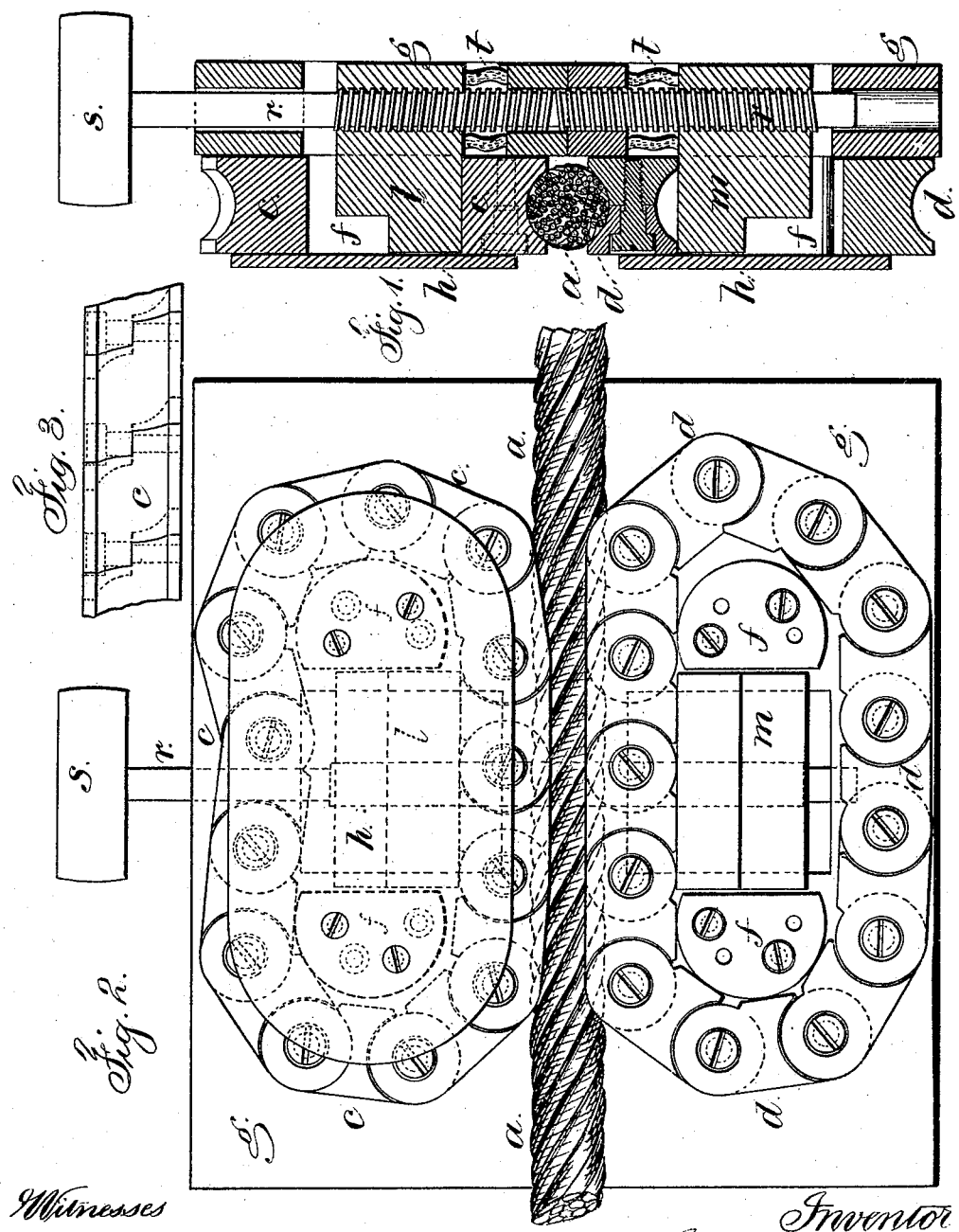

HENRY R. TAYLOR, OF SAN FRANCISCO, CALIFORNIA.

IMPROVEMENT IN CLAMPS FOR WIRE ROPES.

Specification forming part of Letters Patent No. 184,995, dated December 5, 1876; application filed November 1, 1876.

*To all whom it may concern:*

Be it known that I, HENRY R. TAYLOR, of San Francisco, in the State of California, have invented an Improvement in Clamps for Wire Rope, of which the following is a specification:

The object of this invention is to clamp and hold a traveling wire rope, so as to cause it to move a car or other article, and at the same time to avoid risk of injuring the rope in the act of clamping the same.

I make use of endless chains of clamping-blocks of a shape to fit the surface of the rope, and I provide elliptical ways within which the said chains may move, and also clamping-blocks operated by screws that press the endless chains against the sides of the rope. By this improvement the wire rope is not liable to injury, because the chains of clamping-blocks will move with the wire rope until the friction of the clamping-surfaces is sufficient to overcome the inertia of the car or other article to be moved.

In the drawing, Figure 1 is a section transversely of the wire rope and clamping apparatus, and Fig. 2 is an elevation of the same.

The wire rope *a* is propelled in any desired manner, and it passes between the two chains *c d*, each of which is made of blocks jointed together, so as to be flexible, and the surfaces of the blocks adjacent to the wire rope are grooved semicircularly to fit such wire rope *a*. The joints in the chains are made, as seen in Fig. 3, with the curved surfaces of the joints corresponding with the same portions of the grooved faces in order that there may not be any angles or projections at the joints that will injure the wire rope.

The chains *c d* pass around the fixed guide pieces or sheaves *f f*, and between the plate *g* and cheek piece or plate *h*, so that the chains are free to move around the pieces *f* with but little friction; hence, when the rope *a* is not clamped, the car or other article to which the plate *g* is attached can remain stationary, or nearly so, and the wire rope *a* will run upon one of the chains *c* or *d*, if the plate *g* stands vertically, or between such chains if the plate *g* lies horizontally.

Between the guide-pieces *f* there are sliding clamping-blocks *l m*, operated by the screw-shaft *r*, that passes through such blocks *l m*, and is provided with right and left handed screw threads, so that by turning such shaft *r* by hand-power, or otherwise applied to a crank or pulley *s*, the clamping-blocks *l m* will be drawn together to press the clamping-chains forcibly upon opposite sides of the wire rope, and hold the same. Of course this clamping operation is not sudden, but there is a slip of the rope between the chains and of the chains around their guide-blocks until the inertia of the article to be moved is overcome by the increasing friction produced by the pressure of the screw and clamping-blocks.

Under some circumstances it will only be necessary to revolve the clamping-screw in the opposite direction to loosen the rope, but where it is desired to drop the wire-rope *a* it is preferable to make the plate *g* in two parts, sliding upon stationary cross rods or metallic supports, and to place rubber or metallic springs *t* between the blocks *l m* and the plate *g*, within the openings for said clamping-blocks, in order that the springs may act to keep the two parts of the plate *g* together under the ordinary operation of clamping and relieving the rope, but when the clamp is to be opened and the rope dropped, the further movement of the screw-shaft *r* still farther separates the clamping-blocks *l m*, and with them moves the two parts of the frame *g* away from each other, and separates the chains enough to allow the rope to drop from between them. The reverse motion again secures the rope after it has been placed between the chains.

I claim as my invention—

1. The endless chains of grooved clamping-blocks, in combination with the guide-pieces *f*, and clamps *l m*, substantially as set forth.

2. The plate *g*, divided and receiving in openings therein the sliding clamping-blocks *l m*, in combination with the actuating screw-shaft *r*, and endless chain of grooved clamping-blocks, substantially as set forth.

Signed by me this 17th day of October, A. D. 1876.

HENRY R. TAYLOR.

Witnesses:
GEO. D. WALKER,
CHAS. H. SMITH.